United States Patent
Frezza et al.

(10) Patent No.: US 11,846,322 B2
(45) Date of Patent: Dec. 19, 2023

(54) SUPPORT ASSEMBLY FOR FOOD APPLICATIONS HAVING AN IMPROVED SEAL

(71) Applicant: AKTIEBOLAGET SKF, Gothenburg (SE)

(72) Inventors: Pasquale Frezza, Aversa (IT); Fabio Falaschi, Carrara (IT); Andrea A. Bertolini, Carrara (IT); Fabio Cavacece, Rome (IT)

(73) Assignee: Aktiebolaget SKF

( * ) Notice: Subject to any disclaimer, the term of this patent is extended or adjusted under 35 U.S.C. 154(b) by 0 days.

(21) Appl. No.: 17/713,273

(22) Filed: Apr. 5, 2022

(65) Prior Publication Data
US 2022/0325759 A1 Oct. 13, 2022

(30) Foreign Application Priority Data
Apr. 12, 2021 (IT) .................. 102021000008990

(51) Int. Cl.
*F16C 35/04* (2006.01)
*F16C 33/72* (2006.01)
*F16C 33/76* (2006.01)

(52) U.S. Cl.
CPC .......... *F16C 35/042* (2013.01); *F16C 33/723* (2013.01); *F16C 33/76* (2013.01)

(58) Field of Classification Search
CPC ...... F16C 23/08; F16C 23/082; F16C 23/084; F16C 33/723; F16C 33/726; F16C 35/00; F16C 35/04; F16C 35/042; F16C 35/045
See application file for complete search history.

(56) References Cited

U.S. PATENT DOCUMENTS

| 7,011,593 | B2 * | 3/2006 | Schenk | F16C 33/723 |
| | | | | 384/477 |
| 10,190,636 | B2 * | 1/2019 | Falaschi | F16C 33/723 |
| 11,460,074 | B2 * | 10/2022 | Missiaggia | F16C 33/723 |

FOREIGN PATENT DOCUMENTS

| DE | 8632410 | 2/1987 |
| IT | 201900011439 | 1/2021 |
| WO | 2016156962 | 10/2016 |

OTHER PUBLICATIONS

Search Report for corresponding Italian Patent Application No. 102021000008990 dated Dec. 3, 2021.

\* cited by examiner

*Primary Examiner* — James Pilkington
(74) *Attorney, Agent, or Firm* — Reed Smith LLP (57) ABSTRACT

A support assembly for a movable shaft includes a bearing unit that receives the shaft, a casing, and a cover. The cover includes an annular coupling portion extending towards a radially external lateral surface of the casing. The annular coupling portion has circumferentially spaced teeth projecting from a radially inside surface thereof. The lateral surface includes an annular seat that receives the teeth. The annular seat includes an annular groove axially spaced with respect to a front edge of the casing that defines an opening of the casing and is connected to axial grooves that interrupt radially at least part of the front edge of the casing. A bottom wall of the annular groove has depressions alternating with projections offset with the axial grooves. The annular coupling portion includes radially internal projections that engage with the lateral surface of the casing along portions free of axial grooves.

9 Claims, 6 Drawing Sheets

SUPPORT ASSEMBLY FOR FOOD APPLICATIONS HAVING AN IMPROVED SEAL

CROSS-REFERENCE OF RELATED APPLICATIONS

This application is based on and claims priority to Italian Patent Application No. 102021000008990 filed on Apr. 12, 2021, under 35 U.S.C. § 119, the disclosure of which is incorporated by reference herein.

FIELD

The present disclosure relates to a novel fastening system between a casing and a cover of a support assembly for food applications.

BACKGROUND

A support assembly is generally fixed to a machine frame and is intended to support movable shafts, for example rotating shafts, by means of a suitable bearing unit.

BRIEF DESCRIPTION OF THE DRAWINGS

Various embodiments in accordance with this disclosure will now be described with reference to the attached drawing, which shows a non-limiting example of its embodiment, in which.

DETAILED DESCRIPTION

In the food industry (also known as "food and beverages", or simply "F&B") there has been an increasing interest in the development of new machines and machine designs intended to improve the safety and quality of foods. The machines used in the food industry have numerous moving parts supported by rotating or slidable shafts, such as conveyor belts, mixers, and machines for washing fresh foods.

All these machines have to be cleaned frequently, usually with water to which detergents and/or disinfectants have been added, in order to control any development of bacterial colonies that might contaminate the foods. In particular, these machines must not have any gaps or other parts where dirt, or even the washing water, can penetrate and stagnate. This is because the stagnation of liquids or moisture favours a possible proliferation of bacteria.

This problem is particularly acute in relation to the support assemblies for movable shafts, which may be of the terminal type, housing a terminal end of the shaft, or of the through type. These support assemblies are formed by a casing, usually annular, having a base or flange for fixing to the machine, a bearing unit, located inside the casing and coupled to the movable shaft, and a cover, normally cup-shaped, which is coupled with a force fit to the casing in such a way that a coupling portion of the cover forms a fluid seal with a radially outer lateral surface of the casing.

For a forced mounting of a known type, the cover has to be fitted, by snap-fitting for example, on the outside of the casing, for example by engaging a groove formed on a radially outer lateral surface of the casing. The cover has a plurality of teeth which engage in the groove of the casing. Inside the groove of the casing there are projections, in the form of ascending and descending ramps, which serve to lock the teeth of the cover in the circumferential direction.

In other words, in the mounting step, the cover is positioned on the casing and the teeth of the cover reach the groove of the casing through corresponding openings on the outer surface of the casing. Then, in a typical bayonet coupling, the cover is rotated and the teeth of the cover travel over corresponding projections along the groove of the casing. The cover is thus locked, although it can still rotate through an arc of circumference as far as the next projection. The two consecutive projections are angularly spaced so that the tooth of the cover is not located next to an opening present on the outer surface of the casing through which it could exit and thus cause the demounting of the cover.

As a result of the cover mounting procedure, the coupling portion of the cover does not, strictly speaking, provide the function of sealing the casing, since the profile is not optimized in accordance with the shape of the casing. Indeed, during mounting, the sealing lip of the coupling portion of the cover tends to open, in other words to be deformed in a radially outward direction. Consequently the sealing of the cover on the casing is not ensured, particularly during the washing procedures, in which considerable quantities of fluid are used.

It is therefore necessary to define a support assembly that offers a novel design solution capable of resolving, or at least mitigating, the aforementioned drawbacks.

A novel inner sealing system in accordance with this disclosure improves sealing performance in the presence of water and detergents at high pressure and temperature.

A novel fastening system in accordance with this disclosure improves the mounting of the cover on the casing, and especially the sealing performance.

Machines for use in the F&B industry have to be cleaned frequently, usually with water to which detergents and/or disinfectants have been added, in order to control any development of bacterial colonies that might contaminate the foods. In particular, these machines must not have any gaps or other parts where dirt, or even the washing water, can penetrate and stagnate. This is because the stagnation of liquids or moisture favours a possible proliferation of bacteria.

This problem is particularly acute in relation to support assemblies for movable shafts, which may be of the terminal type, housing a terminal end of the shaft, or of the through type. A support assembly is formed by a casing, usually annular, having a base or flange for fixing to the machine, a bearing unit, located inside the casing and coupled to the movable shaft, and a cover, normally cup-shaped, which is coupled with a force fit to the casing in such a way that a coupling portion of the cover forms a fluid seal with a radially outer lateral surface of the casing.

For a forced mounting, a cover has to be fitted, by snap-fitting for example, on an outside of the casing, for example by engaging a groove formed on a radially outer lateral surface of the casing. A cover has a plurality of teeth which engage in a groove of a casing. Inside a groove of a casing there are projections in the form of ascending and descending ramps, which serve to lock teeth of a cover in the circumferential direction.

In other words, in a mounting step, a cover is positioned on a casing and teeth of a cover reach a groove of the casing through corresponding openings on an outer surface of the casing. Then, in a typical bayonet coupling, a cover is rotated and teeth of the cover travel over corresponding projections along a groove of a casing. A cover is thus locked, although it can still rotate through an arc of circumference as far as the next projection. Two consecutive projections are angularly spaced so that the tooth of the cover is not located next to an opening present on the outer surface of the casing through which it could exit and thus cause the demounting of the cover.

As a result of a cover mounting procedure, a coupling portion in known solutions of a cover may not, strictly speaking, provide the function of sealing a casing, since the profile is not optimized in accordance with a shape of the casing. Indeed, during mounting, a sealing lip of a coupling portion of a cover tends to open, in other words to be deformed in a radially outward direction. Consequently a sealing of a cover on a casing is not ensured, particularly during the washing procedures, in which considerable quantities of fluid are used. It is therefore necessary to define a support assembly that offers a novel design solution capable of resolving, or at least mitigating, the aforementioned drawbacks.

In order to substantially resolve the aforementioned technical problems, one object of the present disclosure is to define a novel support assembly for food applications, particularly a support assembly for a rotating shaft and a corresponding bearing unit fixed to a machine frame.

For this purpose, according to one aspect of the present disclosure, in order to improve the operation of mounting the cover on the housing and especially the fluid sealing performance of the whole support assembly, the cover of the support assembly is provided with radially inner projections having a different cross section from that of the teeth of the cover which are used for the bayonet fastening.

These additional projections improve the mounting of the cover because they enable a larger opening to be provided in the radially outward direction during the axial coupling with the casing, and prevent the sealing lip from deforming when it comes into contact with the casing.

Therefore, according to various embodiments, a support assembly for food applications is provided, with the characteristics stated in the independent claim appended to the present description.

Further preferred and/or particularly advantageous embodiments are described according to the characteristics stated in the appended dependent claims.

Purely by way of non-limiting example and with reference to the aforesaid figures, the number 1 indicates the whole of a support assembly for movable, rotating or slidable shafts which, for the sake of simplicity, are not illustrated.

The support assembly 1 further comprises a bearing unit 2, for example a rolling bearing of a known type, capable of housing in a known way a movable shaft 5, for example a rotating shaft, and a casing 3 having a through seat 4 within which the bearing unit 2 is housed in a stable and known way.

The support assembly 1 is, in particular, intended to be mounted on machines for the food industry. For this purpose, the casing 3, which is illustrated in front elevation in FIG. 2, is of the type intended to be mounted in a fixed way on the frame of a machine, particularly for use in the food industry, which for the sake of simplicity is not illustrated.

The casing 3 has an annular overall shape, and is designed so as to be able to house the bearing unit 2 in a through seat 4. The casing further comprises a base or flange 8 for fixing to said frame of a machine; the seat 4 has an overall axis of symmetry X which is also the axis of symmetry of the casing 3.

Figure 2:
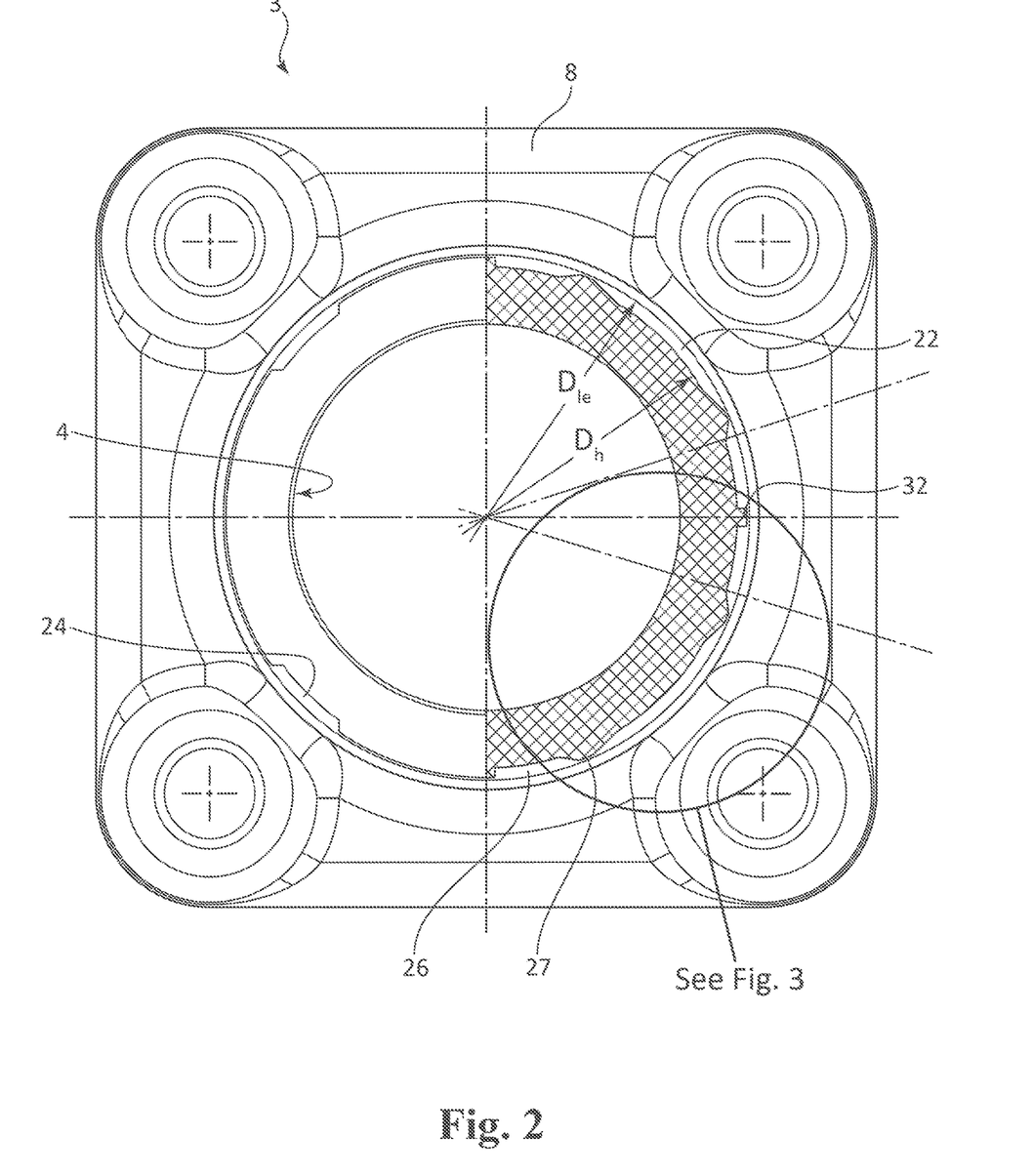
FIG. 2 shows a front elevation of a casing of the support assembly of FIG. 1.

Evidently, the embodiment of the casing 3, shown in FIG. 2, is only one of the possible embodiments; for example, the base or flange 8, which is square in the illustrated example, may have another symmetrical or asymmetrical shape.

In any case, the support assembly 1 again comprises a cover 10 for fluid sealing an opening 11 of the through seat 4 of the casing 3.

The cover 10 for the casing 3 is bowl-shaped overall and comprises a bottom wall 12, an annular lateral wall 13 extending transversely relative to the bottom wall 12, and a coupling portion 14 towards the casing 3.

The coupling portion 14 is annular and is designed to be coupled, in use, to the casing 3, laterally on the outside of said casing. In particular, it is shaped as a socket joint and is coupled radially and laterally on to the outside of a radially outer lateral surface 16 of the casing 3.

Figure 1:
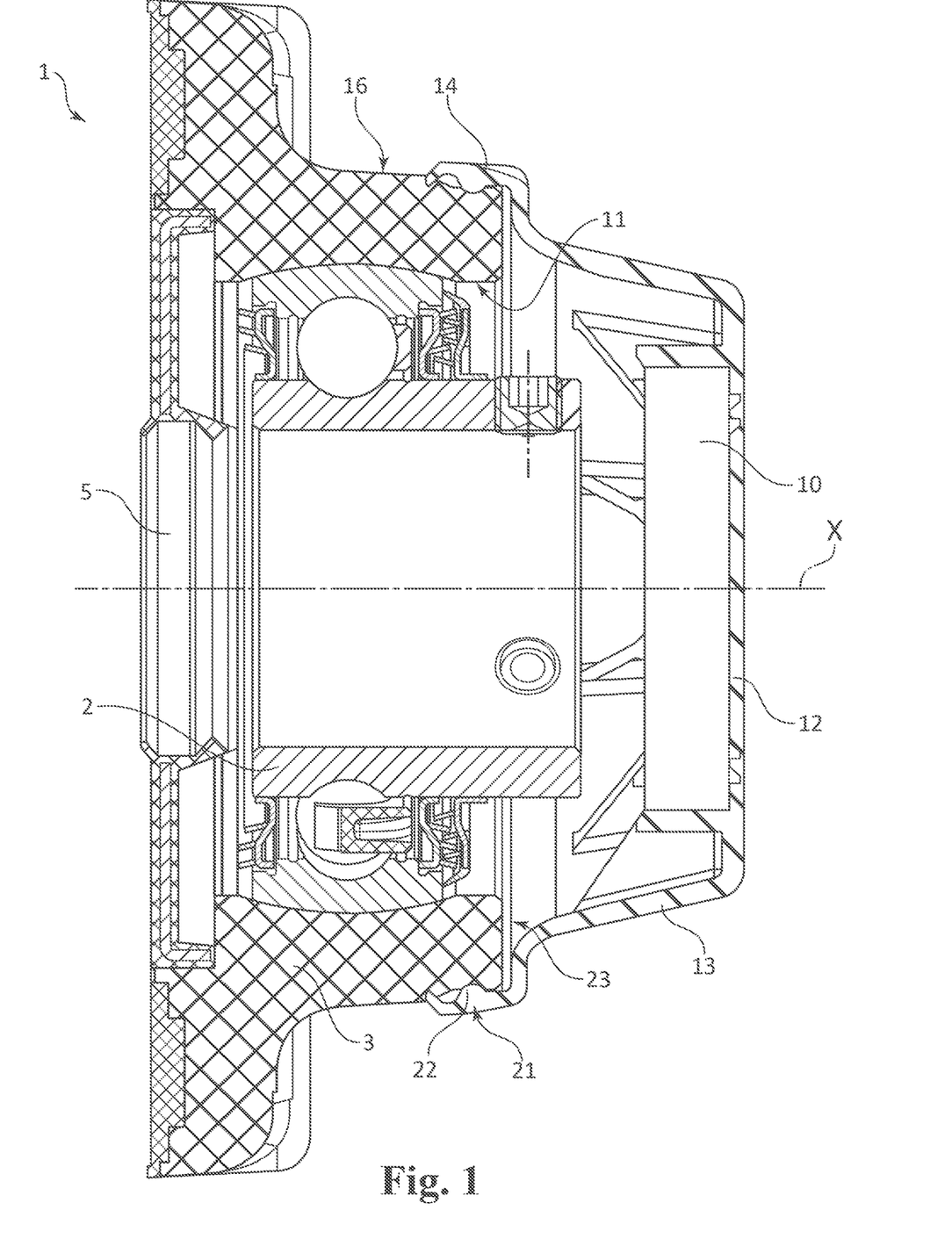
FIG. 1 shows a cross section through the support assembly according to various embodiments in accordance with this disclosure.

The lateral surface 16 and the coupling portion 14 are defined by solids of revolution, and have a common axis of symmetry, which, in the illustrated examples, coincides with an axis of symmetry X (FIG. 1) of the cover 10, and which is also the axis of symmetry of the casing 3 and of the through seat 4.

Figure 4:
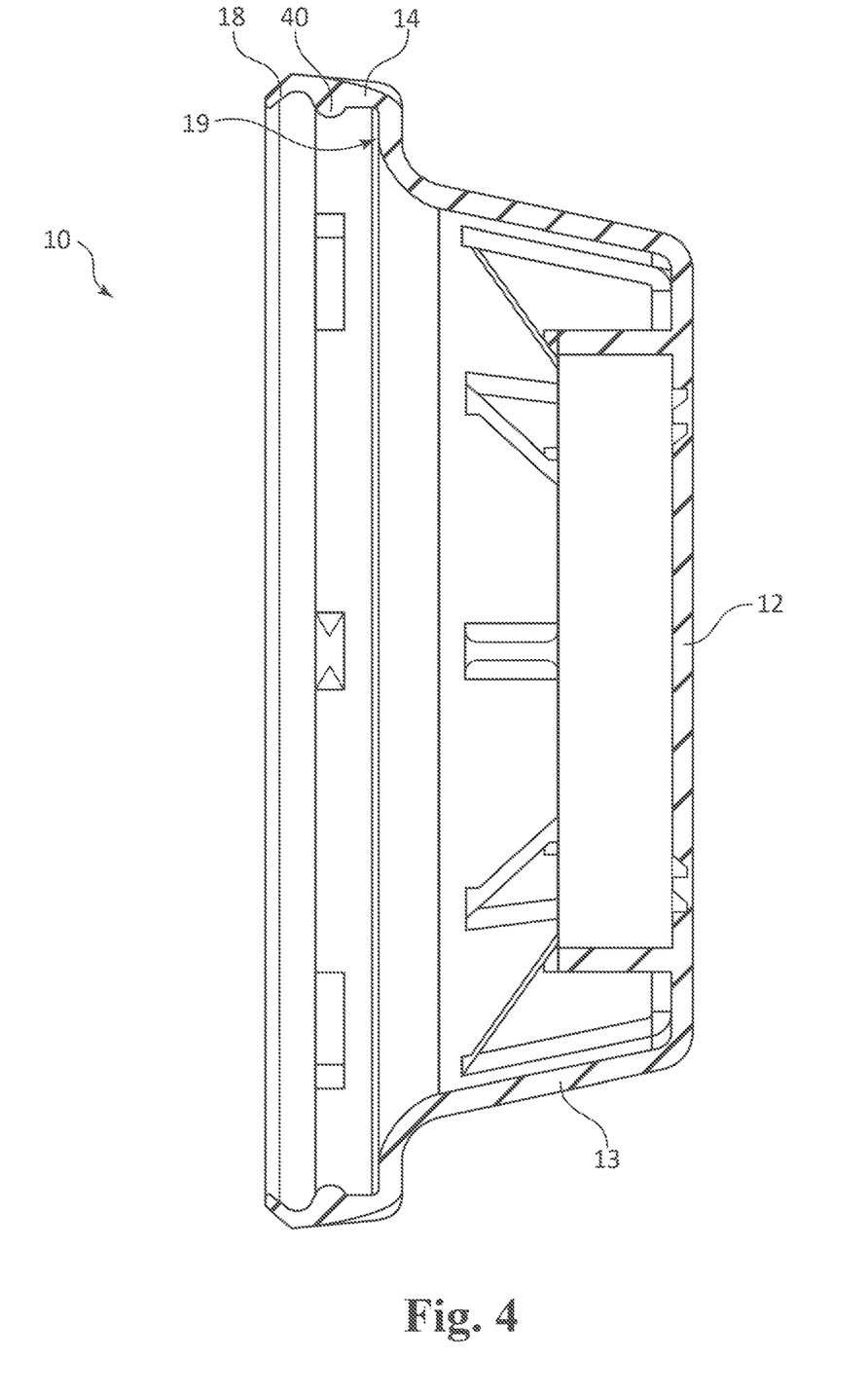
FIG. 4 shows a side view of a cover of the support assembly of FIG. 1.

The cover 10 is made in one piece from a suitably chosen synthetic plastic material, and the coupling portion 14 is provided, on the opposite side to the bottom wall 12, with an annular sealing lip 18, which extends frontally and projectingly from a front edge 19 (FIG. 4) of the coupling portion 14, and which is made from the same synthetic plastic material as the cover 10 so as to be elastically deformable in a radial direction from the inside towards the outside.

Figure 5:
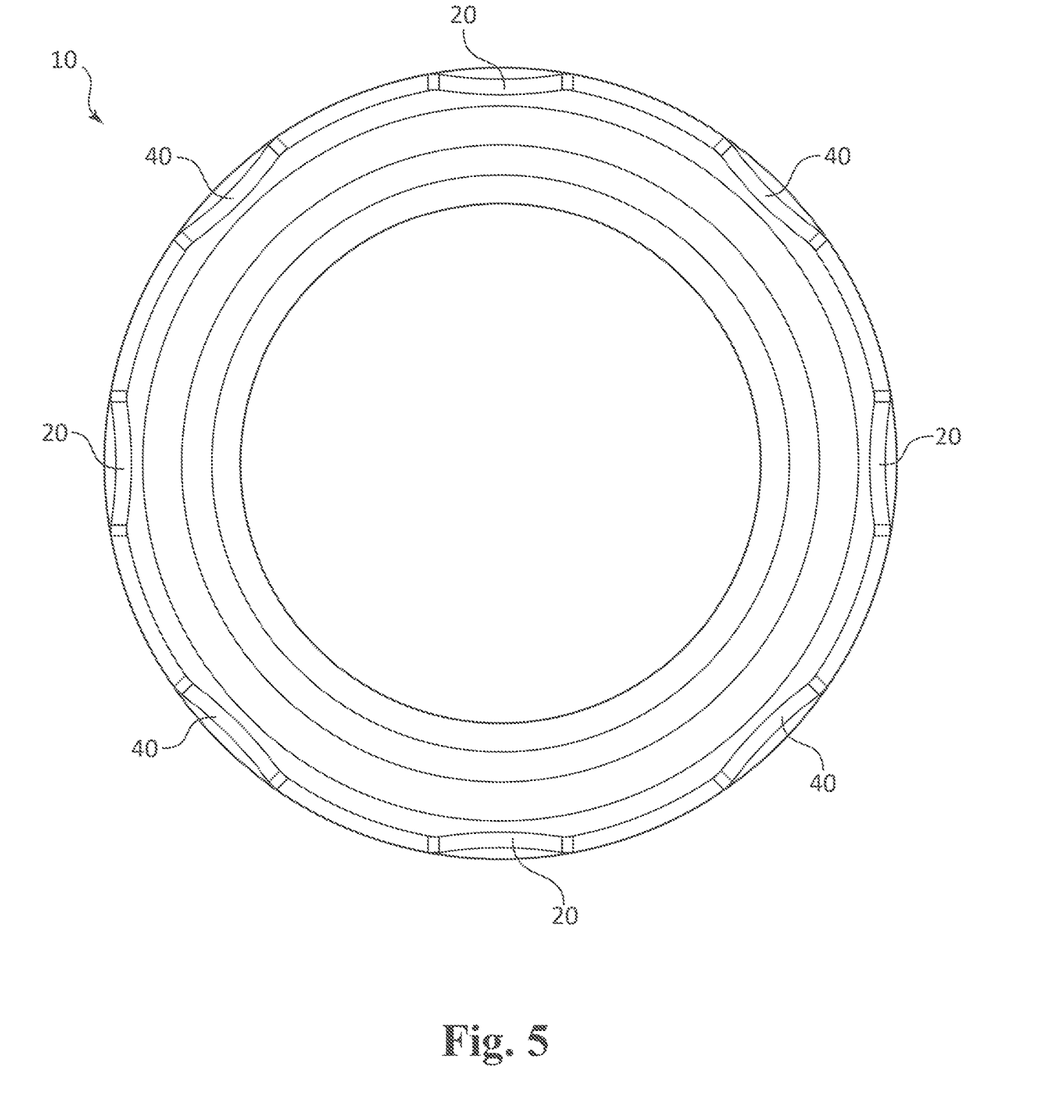
FIG. 5 shows a front view of the cover of the support assembly of FIG. 1.

The coupling portion 14 of the cover 10 is provided radially on the inside with at least one pair of teeth, 20 projecting radially towards the inside of the cover 10 and spaced circumferentially from each other, each of which extends over a limited circumferential portion of the coupling portion; in the non-limiting example shown in FIG. 5, the teeth 20 are four in number and are spaced at 90° to each other.

Figure 7:
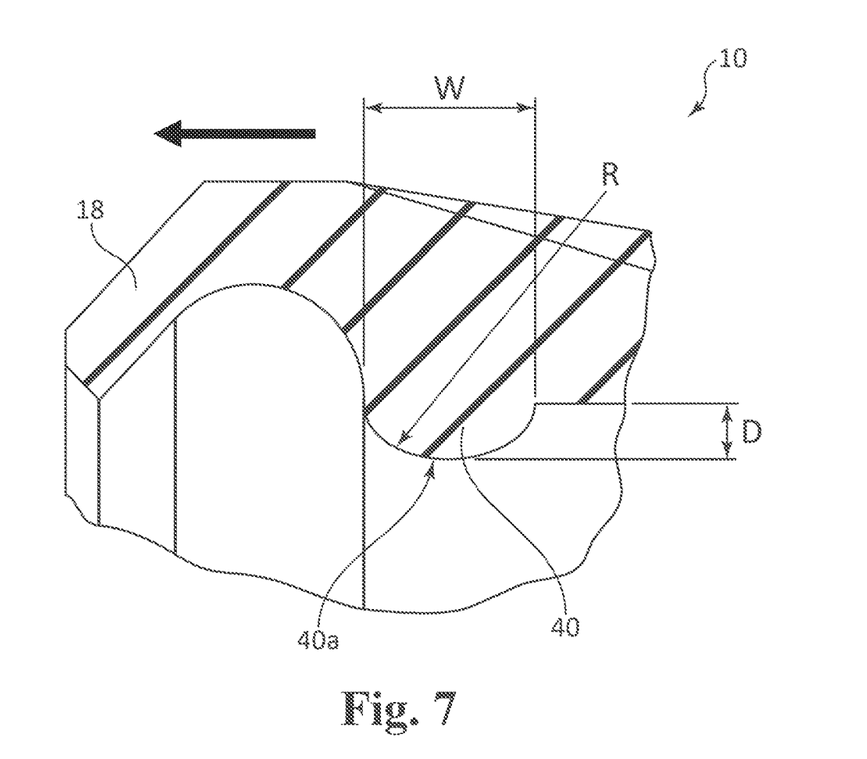

According to at least one aspect, in order to improve the operation of mounting the cover on the housing and especially the fluid sealing performance of the whole support assembly, the annular coupling portion 14 of the cover 10 of the support assembly 1 is also provided with a plurality of radially inner projections 40 having a different end section from that of the teeth 20 for the bayonet fastening. In particular, the projection 40 are provided with a convex end surface 40*a* (FIG. 7).

These additional projections 40, as shown in FIG. 5 in the illustrated example of embodiment, may be four in number and alternate with the teeth 20. Therefore the projections 40 will also be angularly spaced at 90° to each other, while the angular distance between a projection 40 and a subsequent tooth 20 will be 45°. The projections 40 are a particular aspect of embodiments disclosed herein, and, as a result of their particular shapes and dimensions, have the purpose of improving the mounting of the cover on the casing, as explained more fully below.

In combination with the presence of the teeth 20 on the cover 10, the radially outer lateral surface 16 of the casing 3 is provided with an annular seat 21 for receiving the teeth 20 of the cover 10. The annular seat 21 consists of an annular groove 22 arranged to be axially spaced with respect to a front edge 23 of the casing 3 delimiting the opening 11 and provided with a number of axial grooves 24 equal to the number of teeth 20 present on the cover 10, these grooves 24 radially interrupting at least part of the front edge 23 of the casing 3.

The bottom wall 25 of the annular groove 22 is circumferentially provided with an alternating plurality of depressions 26 and projections 27 arranged to be circumferentially offset with respect to the axial grooves 24. A rear sealing device according to various embodiments has three main characteristics.

A first characteristic, as indicated above, is due to the fact that the position and geometry of the further third sealing lip 54 are such that, as the water pressure increases, the thrust received by the third lip against the radially inner ring 34 also increases; in other words, the greater the interference created between the third sealing lip 54 and the radially inner ring 34, the better will be the sealing performance of this third sealing lip.

The axial grooves 24 have a radial depth identical to the radial depth of the annular groove 22 at the position of the axial grooves 24, so that corresponding bottom walls of the axial grooves and the bottom wall 25 of the radial groove 22 lie flush with each other.

Since, in the preferred example of embodiment illustrated, the cover 10 has two pairs of teeth 20 arranged to be circumferentially spaced in a symmetrical manner, being offset by 90°, in this case, the radially outer lateral surface 16 of the casing 3 has two pairs of axial grooves 24 arranged to be circumferentially spaced in a symmetrical manner, being offset by 90°. The bottom wall 25 of the annular groove 22 has a plurality of circumferential sectors having the same angular amplitude, consisting of eight depressions 26, of which four are axially delimited by the edge 23 and the other four are free, being arranged at the positions of the grooves 24, and eight projections 27. The depressions 26 are delimited by curved surfaces flush with the bottom wall 25 of the annular groove 22, while the projections 27 project radially with respect to the bottom wall 25 of the annular groove 22 and are arranged alternately with the depressions 26.

Figure 3:
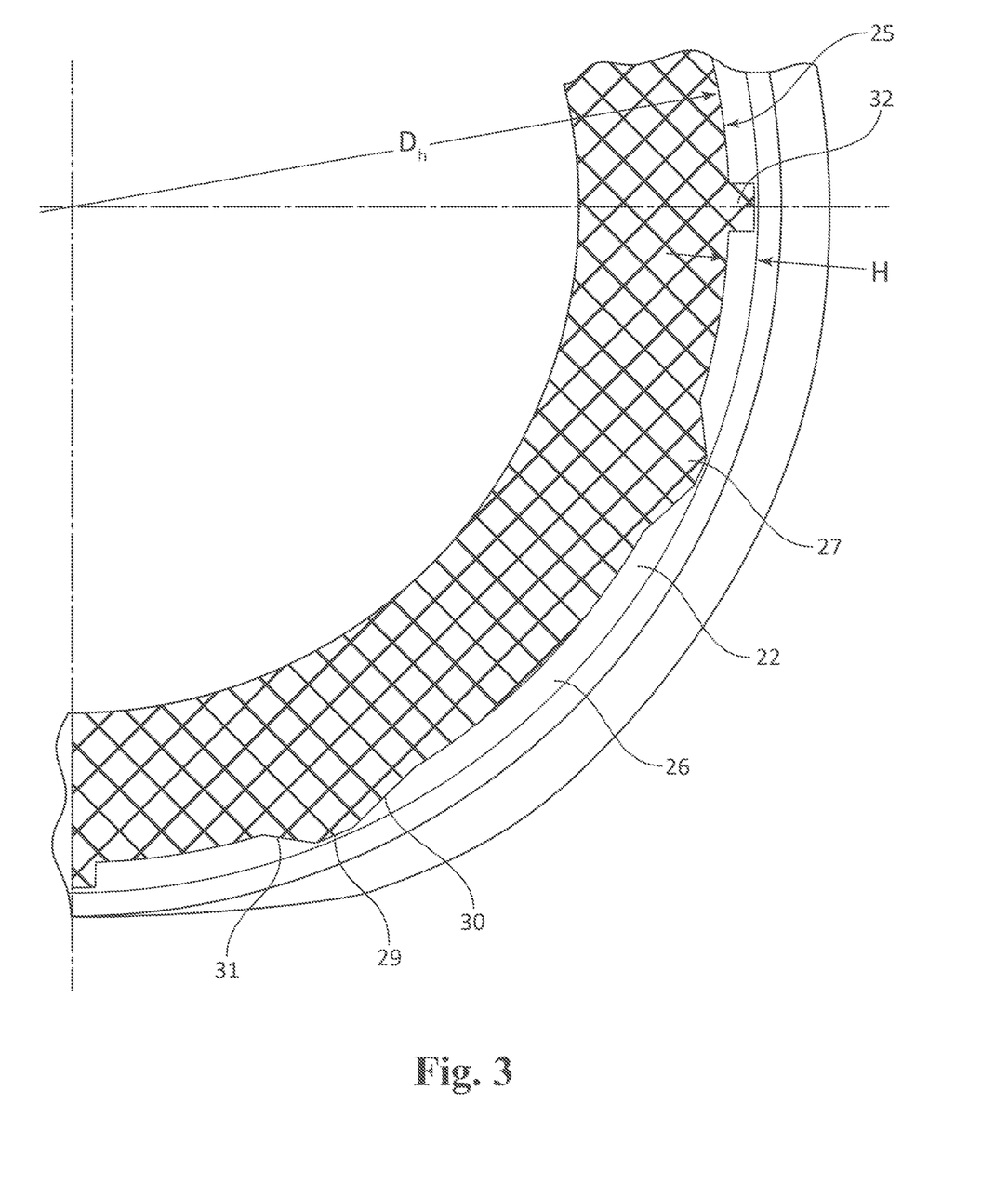
FIG. 3 shows a detail of FIG. 2 on an enlarged scale.

Advantageously, the projections 27 of the annular groove 22 (FIG. 3) each comprise a first circumferential portion 29 of flat surface raised with respect to the bottom wall 25 of the annular groove 22 and second and third circumferential portions of flat surface 30, 31 which flank the first portion 29 and which form two inclined planes that connect the first portion 29 of the surface with the bottom wall 25 of the annular groove 22. The two inclined planes are characterized in that they have different inclinations, and the projections 27 therefore take the form of an asymmetric ramp. In particular, as shown in FIG. 3, the second circumferential portion of flat surface 30 has a smaller inclination (in other words, it is less steep) than the third circumferential portion of flat surface 31 (which is steeper).

Advantageously, the annular groove 22 has at least one pair of mechanical stops 32 which are further projections with respect to the bottom wall 25 of the annular groove 22. The projections 32 protrude in a radial direction with respect to corresponding depressions 26 and extend flush with the lateral surface 16 of the casing 3. The introduction of this characteristic creates an end stop for the tooth 20 of the cover 10 during the mounting procedure, and the number of mechanical stops 32 is therefore equal to the number of teeth 20 of the cover 10.

The projections 40 play a fundamental role in improving the mounting of the cover 10 on the casing 3, and especially in improving the fluid seal between these components, by allowing a larger opening of the cover 10 during the coupling in the axial direction to the casing 3, and by preventing the deformation of the coupling portion 14, and particularly of the annular sealing lip 18 of the cover 10.

Indeed, it will be recalled that the mounting of the cover 10 on the casing 3 requires a first step of coupling the two components in the axial direction and a second step of rotating the cover with respect to the casing. In other words, in the mounting step, the cover 10 is first positioned on the casing 3, and the teeth 20 of the cover 10 enter, through the corresponding axial grooves 24 along the lateral surface 16 of the casing 3, the annular groove 22 of the casing 3 at the position of a depression 26 of the annular groove 22. Then, in the second step, the bayonet coupling is formed by rotating the cover 10 so that the teeth 20 of the cover 10 ride over the corresponding projections 27 along the annular groove 22 of the casing 3.

Figure 6:
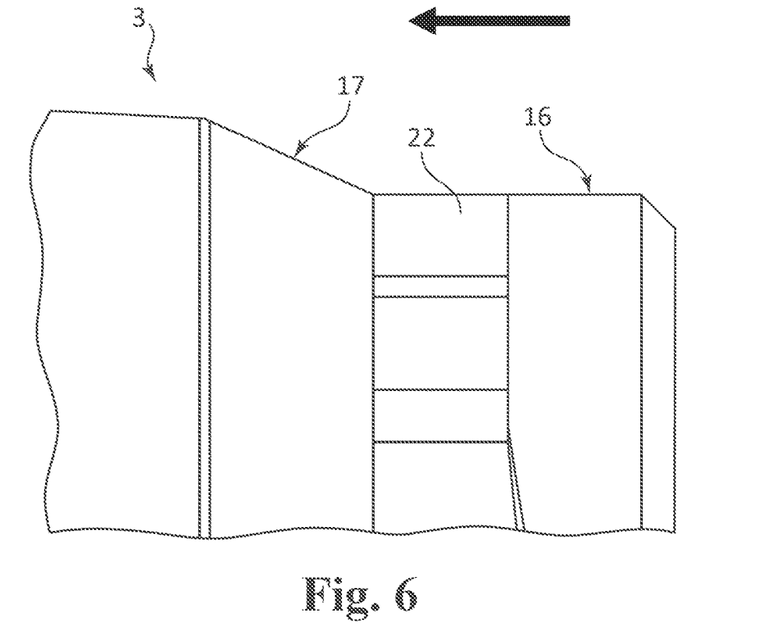
FIGS. 6 and 7 show two details of respective coupling portions between the casing and the cover.

With additional reference to FIGS. 6 and 7, during the first coupling step (coupling in an axial direction, along the direction indicated by the arrow), the projections 40 are coupled to the lateral surface 16 of the casing 3 along a circumferential portion without axial grooves 24. Thus, during the first step of mounting, there is no contact between the sealing lip 18 of the cover 10 and the lateral surface 16 of the casing 3, even in its frustoconical portion 17. Consequently there is no interference and therefore no condition of stress on the sealing lip 18, and, therefore, no bending deformation of said lip relative to the casing 3.

In the second step of mounting (bayonet coupling), on the other hand, when the teeth 20 of the cover 10 ride over the corresponding projections 27 along the annular groove 22 of the casing 3, the projections 40 also rotate and cease to be stressed, since they reach corresponding depressions 26 in the annular groove 22 of the casing 3. In this step, that is to say with the cover mounted on the casing, the contact is between the lateral surface 16 of the casing and the sealing lip 18, providing better sealing performance.

The design of the projections 40 is very complex and must take various factors into account.

Firstly, the dimensions of the annular groove 22 must be considered. Its depth H in the radial direction is determined by the following formula:

$$H = (D_{le} - D_h)/2$$

where $D_{le}$ (FIG. 2) is the diameter of the lateral surface 16 of the casing 3, $D_h$ (FIG. 2) is the diameter of the bottom wall 25 of the annular groove 22.

Consequently, the width W in the axial direction of the projection 40 must be such that it allows the projection to be inserted accurately into the annular groove 22. It must be as follows:

$$R \leq 0.4 \text{ mm}$$

The limitation of the width W of the projection 40 is necessary to ensure that its profile always enters, with a certain safety margin, into the annular groove 22 of width H, when the cover 10 is mounted and rotated to close it on the casing.

$$0.6 \text{ mm} \leq D \leq 0.8 \text{ mm}$$

With this choice of dimensions, the coupling between the projection 40 of the cover 10 and the lateral surface 16 of the casing 3 makes it possible to complete the first mounting step (the axial coupling) without creating any interference between the annular sealing lip 18 of the cover 10 and the frustoconical portion 17 of the lateral surface 16 of the casing 3.

Moreover, the value of the radial thickness D is also helpful during the procedure of demounting the cover 10, since the rounded profile with the convex surface 40a slides on the annular groove 22 of the casing 3 and releases the annular sealing lip 18 of the cover when the projection 40 is located on the lateral surface 16 of the casing.

Finally, as a result of the introduction of the new projections 40 on the cover 10, the support assembly 1 can be certified for new units of "food and beverage" lines, since it can offer better sealing performance of the cover on the casing, since the sealing lip is not deformed during mounting and better axial coupling for the fastening of the cover to the casing.

In various embodiments, a support assembly (1) for movable, rotating or sliding shafts (5), comprising a bearing unit (2) adapted to receive the movable shaft, a casing (3) and a cover (10) for fluid sealing an opening (11) of an internal seat (4) of the casing (3); the cover (10) comprising an annular coupling portion (14) towards a radially external lateral surface (16) of the casing (3), the annular coupling portion (14) being provided radially on the inside with at least one pair of teeth (20) projecting radially towards the inside of the cover and spaced circumferentially from each other; the radially external lateral surface (16) of the casing (3) being provided with an annular seat (21) for receiving the teeth (20) of the cover,—the annular seat (21) consisting of: an annular groove (22) arranged axially spaced with respect to a front edge (23) of the casing (3) delimiting the opening (11) and connected to a number of axial grooves (24) equal to the number of teeth (20) present on the cover and which interrupt radially at least part of the front edge (23); and in a bottom wall (25) of the annular groove (22) which is circumferentially provided with an alternating plurality of depressions (26) and projections (27), the projections being arranged circumferentially offset with respect to the axial grooves (24); the support assembly (1) being characterized in that the annular coupling portion (14) of the cover (10) is provided with a plurality of radially internal projections (40) which engage, in sequence, with the lateral surface (16) of the casing (3) along a circumferential portion without axial grooves (24) and with corresponding depressions (26) in the annular groove (22) of the casing (3).

In various embodiments of a support assembly the plurality of protrusions (40) has a convex end surface (40a).

In various embodiments of a support assembly the annular groove (22) has at least one pair of mechanical stops (32) of the at least one pair of teeth (20) of the cover (10), the mechanical stops (32) extending in a radial direction with respect to corresponding depressions (26) to be flush with the lateral surface (16) of the casing (3).

In various embodiments of a support assembly the projections (27) of the annular groove (22) each comprise a first circumferential portion (29) of flat surface raised with respect to the bottom wall (25) of the annular groove (22) and second and third circumferential sections of flat surface (30, 31) which flank the first section (29) and which form two inclined planes that connect the first section (29) of the surface with the bottom wall (25) of the groove annular (22) and in which the slope of the second section (30) is less than the slope of the third section (31), thus assuming the projections (27) an asymmetrical shape.

In various embodiments of a support assembly the projections number of the plurality of projections (40) is equal to the number of teeth (20).

In various embodiments of a support assembly the plurality of projections (40) are four in number, are alternated with the teeth (20), are angularly spaced 90° from each other, while the angle between a projection (40) and a subsequent tooth (20) is 45°.

In various embodiments of a support assembly, the width (W) in the axial direction of the projections (40) is related to the width (H) of the annular groove (22) by the relationship:

$$W \leq H - 2 \text{ mm}$$

In various embodiments of a support assembly the radius (R) of curvature of the convex surface (40a) of the end projections (40) follows the following relationship follows the following relationship:

$$R \leq 0.4 \text{ mm}$$

In various embodiments of a support assembly, the radial thickness (D) of the protuberances (40) follows the following relationship:

$$0.6 \text{ mm} \leq D \leq 0.8 \text{ mm}$$

In order to substantially resolve the aforementioned technical problems, one object of embodiments in accordance with this disclosure is to define a novel support assembly for food applications, particularly a support assembly for a rotating shaft and a corresponding bearing unit fixed to a machine frame.

For this purpose, according to one aspect, in order to improve the operation of mounting the cover on the housing and especially the fluid sealing performance of the whole support assembly, the cover of the support assembly is provided with radially inner projections having a different cross section from that of the teeth of the cover which are used for the bayonet fastening.

These additional projections improve the mounting of the cover because they enable a larger opening to be provided in the radially outward direction during the axial coupling with the casing, and prevent the sealing lip from deforming when it comes into contact with the casing.

Therefore, in various embodiments, a support assembly for food applications is provided, with the characteristics stated in the independent claim appended to the present description.

Further preferred and/or particularly advantageous embodiments are described according to the characteristics stated in the appended dependent claims.

In addition to the various embodiment of the invention as described above, it is to be understood that there are numerous other variants. It is also to be understood that these embodiments are described solely by way of example and do not limit the object of the invention or its applications or its possible configurations. On the contrary, although the description given above enables a person skilled in the art to implement the present invention according to at least one example of its embodiment, it is to be understood that numerous variations of the components described are possible without departure from the object of the invention as defined in the appended claims, which are interpreted literally and/or according to their legal equivalents.

We claim:

1. A support assembly for a movable shaft, comprising:
a bearing unit adapted to receive the movable shaft;

a casing; and a cover comprising an annular coupling portion that extends toward a radially external lateral surface of the casing, the annular coupling portion being provided radially on a radially inside surface with at least one pair of teeth projecting radially inward and spaced circumferentially from each other;

wherein the radially external lateral surface of the casing comprises:

an annular seat configured to receive the teeth of the cover, the annular seat comprising an annular groove axially spaced with respect to a front edge of the casing delimiting an opening of the casing and connected to a number of axial grooves equal to a number of teeth on the cover and which interrupt radially at least part of the front edge of the casing, and wherein a bottom wall of the annular groove comprises a plurality of depressions alternating with a plurality of projections, the plurality of projections being arranged circumferentially offset with respect to the axial grooves;

wherein the annular coupling portion of the cover comprises plurality of radially internal projections which engage with the radially external lateral surface of the casing along a circumferential portion free of axial grooves, and the plurality of radial internal projections engage with corresponding depressions in the annular groove of the casing when the teeth engage with the annular groove.

2. The support assembly of claim 1, wherein each projection of the plurality of the radial internal projections comprises a convex end surface.

3. The support assembly of claim 2, wherein a radius of curvature (R) of the convex end surface of each radial internal projection is less than or equal to 0.4 mm.

4. The support assembly of claim 1, wherein the annular groove comprises at least one pair of mechanical stops for the at least one pair of teeth of the cover, each mechanical stop extending in a radial direction, with respect to corresponding depressions, to be flush with the radially external lateral surface of the casing.

5. The support assembly of claim 1, wherein each projection of the plurality of projections of the annular groove comprises:

a first circumferential section comprising a flat surface, raised with respect to the bottom wall of the annular groove, and a second and a third circumferential section, each having a flat surface, which flank the first circumferential section and which form two inclined planes that connect the first circumferential section with the bottom wall of the annular groove, wherein a slope of the second section is less than a slope of the third section so that the projections have an asymmetrical shape.

6. The support assembly of claim 1, wherein the number of radially internal projections is equal to the number of teeth.

7. The support assembly of claim 6, wherein, there are four radial internal projections that are angularly spaced from each other by 90°, and the radial internal projections alternate with the teeth in the circumferential direction so that an angle between a radial internal projection and a subsequent tooth is 45°.

8. The support assembly of claim 1, wherein an axial width (W) of the radial internal projections is related to a radial width (H) of the annular groove by:

$W \leq H - 2$ mm.

9. The support assembly of claim 1, wherein a radial thickness (D) of each radial internal projection comprises between 0.6 mm and 0.8 mm, inclusive.

* * * * *